United States Patent
Jager

(10) Patent No.: US 8,244,653 B2
(45) Date of Patent: Aug. 14, 2012

(54) PROFILE CONFIGURATION FOR A MOBILE COMPUTING DEVICE

(75) Inventor: Ivo Ruben Willem Jager, Amstelveen (NL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/042,222

(22) Filed: Mar. 7, 2011

(65) Prior Publication Data

US 2011/0161262 A1    Jun. 30, 2011

Related U.S. Application Data

(63) Continuation of application No. 11/868,925, filed on Oct. 8, 2007, now Pat. No. 7,917,456.

(51) Int. Cl.
*G06F 15/18* (2006.01)
*G06F 17/30* (2006.01)
*G05B 13/02* (2006.01)

(52) U.S. Cl. .............. 706/20; 706/21; 706/23; 707/749
(58) Field of Classification Search ............ 706/20
See application file for complete search history.

(56) References Cited

U.S. PATENT DOCUMENTS

2005/0275406 A1    12/2005    Hatalker
2006/0111093 A1    5/2006    Shim

FOREIGN PATENT DOCUMENTS

EP    1256875 A1    11/2002

OTHER PUBLICATIONS

Krause et al., Context-Aware Mobile Computing: Learning Context-Dependent Personal Preferences from a Wearable Sensor Array. IEEE Transactions on Mobile Computing, vol. 5, No. 2 [online], Feb. 2006 [retrieved on Sep. 23, 2011]. Retrieved from the Internet< URL:http://ieeexplore.ieee.org/stamp/starnp.jsp?arnumber= 0156 3997>.*
Supplementary European Search Report Mail Date Apr. 26, 2012 for Application No. EP 08838.466-1246/2198528 PCT/US2008/077266.

* cited by examiner

*Primary Examiner* — Jeffrey A Gaffin
*Assistant Examiner* — Nathan Brown, Jr.

(57) ABSTRACT

Data processing apparatus is disclosed comprising: a sensor module configured to sense a first profile comprised of one or more attributes of an environment of said data processing apparatus; and a classification module configured to assign a prediction factor to each of said one or more attributes of said first profile and to store each said attribute and assigned prediction factor as a stored profile.

20 Claims, 8 Drawing Sheets

| Stored profile | Observed behaviour | Action |
|---|---|---|
| Profile(1) | Silent mode, smartphone off | Initiate silent mode |
| Profile(2) | Calls from certain telephone numbers not answered | Ignore call from the certain telephone numbers |
| Profile(i) | None - action set by user | Forward business calls to office telephone |
| Profile(n) (camera in use) | None - pre-set action | Decativate vibration alarm |

FIG. 8

PROFILE CONFIGURATION FOR A MOBILE COMPUTING DEVICE

CROSS REFERENCE TO RELATED APPLICATIONS

This application is a continuation of U.S. application Ser. No. 11/868,925 (now U.S. Pat. No. 7,917,456), filed Oct. 8, 2007, which is incorporated by reference in its entirety.

BACKGROUND

1. Field

The present invention relates to apparatus and method for classifying the environment of a data processing apparatus.

2. Description of the Related Art

Users of communications devices such as cellular telephones, smartphones, personal digital assistants (PDAs) and data processing apparatus in general often have such devices with them at all times. However, while it is convenient to have a communications device present at all times it can be intrusive, for example if telephone calls are received whilst in a meeting or business telephone calls received whilst at home. A user may wish to only receive SMS text messages or voicemail during such times but may forget to configure the communications device to respond to only text messages or take voicemail.

It is also the case that the times when a user would not wish to be disturbed, such as when in a meeting or by business calls when at home are often characterized by the user being in a particular location, with particular people and/or when the user is exhibiting particular behavior or a particular type of use of the device. Such things may be considered to represent the environment of the user and the communications device.

Aspects of the present invention were made with the foregoing in mind.

SUMMARY

Viewed from a first aspect disclosed is a data processing apparatus comprising a sensor module configured to sense a first profile comprising one or more attributes of an environment of the data processing apparatus; and a classification module configured to assign a prediction factor to each of the one or more attributes of the first profile and to store each attribute and assigned prediction factor. Viewed from a second aspect, a method of operating data processing apparatus comprises sensing a first profile comprising one or more attributes of an environment of the data processing apparatus; assigning a prediction factor to each of the one or more attributes of the first profile; and storing each attribute and assigned prediction factor.

Data processing apparatus configured or operated in accordance with the foregoing aspects may sense attributes of the data processing apparatus environment such as cellular telephone cell sites, ambient light and/or noise, and/or the presence of other devices by sensing their Bluetooth signals, as non-limiting examples. At a given moment, the attributes in the environment of the data processing apparatus may be sensed and stored by the data processing apparatus.

Assigning a prediction factor to each attribute in a stored profile provides a value against which attributes of later observed environment profiles may be compared to determine if an observed environment profile is the same or similar to a stored environment profile. If the same or a similar environment to a stored environment is observed then the data processing apparatus settings, or settings of a communications device incorporating the data processing apparatus, may be set to be consistent with settings previously set for the stored environment profile.

In this way, a communications device incorporating such data processing apparatus may be automatically configured according to its environment. Thus, in an office environment an observed profile may match a stored profile which is the profile when the user is at their desk, or in a conference room. The communications device may be automatically configured in accordance with an operational mode associated with the stored profile.

The classification module may be configured to automatically determine a value for the correlation between the first profile and one or more stored profiles and store the first profile if each of the correlation values is less than a threshold level. In this way, the data processing apparatus may automatically determine if an observed profile is different from the stored profiles and store the observed profile. Thus, a new observed environment may be automatically stored thereby automatically building a database of environments for the data processing apparatus.

Optionally, or additionally, a user of the data processing apparatus may initiate storing of an observed profile. Additionally, the classification module may be configured to normalize each assigned prediction factor to the number of attributes in the first profile. For example, each assigned prediction factor may be a number N divided by the number of attributes in the first profile. By making the prediction factors a function of the number of detected attributes, the same absolute level of the prediction factors may be maintained independently of the number of attributes in the first profile.

The classification module may be configured to determine each of the correlation values based on a difference between the presence of one or more attributes in the first profile and the presence of one or more attributes in each of the one or more stored profiles. In this way, it may be determined to what extent an observed profile is similar to stored profiles.

In one embodiment the classification module may be configured to determine each correlation value based on adding and subtracting prediction factors; and to add a prediction factor if associated with an attribute of the stored profile for which a corresponding attribute is present in the first profile and subtract a prediction factor if associated with an attribute of the stored profile for which a corresponding attribute is not present in the first profile. In this way, the similarity between an observed (first) profile and a stored profile is based on the prediction factors for those attributes present in both the first profile and the stored profile.

The data processing apparatus may further comprise a learning module. The classification module may be configured to determine a best match stored profile, the best match stored profile being the stored profile having the highest correlation value with the first profile. The learning module may be configured to update the best match stored profile determined by the classification module for the highest correlation value being equal to or exceeding the threshold value and not being the maximum correlation value. Thus, a stored profile may be updated based on the first profile where the first profile is similar to the stored profile, but not identical. In this way, stored profiles may be adapted and modified to take into account gradual changes in an environment.

The learning module may be configured to update the best match stored profile by adding to the best match profile an attribute of the first profile not present in the best match stored profile. Optionally, or additionally, the learning module may be configured to modify the prediction factor of each attribute present in the best match stored profile. In this way a stored profile may be gradually modified and updated if the environment corresponding to that stored profile gradually changes over time.

The learning module may be configured to add a learning factor to each prediction factor of each attribute present in both the best match stored profile and the first profile. The learning factor may increase the prediction factor (importance) of attributes which are present in both the best match profile and the first profile, and decrease the prediction factor (importance) of those that are not. A "remove" threshold may be set such that an attribute having a prediction factor less than the "remove" threshold is removed from the stored profile. The learning module may be configured to normalize learning factors of the stored best match profile. In addition, in one embodiment using percentage values the formula (100%/number of detected attributes) * learning factor may be used to derive a learning factor which provides an equal amount of change due to updating distributed over all modified attributes.

In one embodiment, the data processing apparatus comprises an action module configured to perform an action associated with said best match stored profile. Such an action might be to inhibit incoming telephone calls, switch calls to voicemail or some other device setting.

In one embodiment, a computer program comprises computer program elements which are implementable in a general data processing apparatus (for example a computer) to configure data processing apparatus and implement a method for such data processing apparatus in accordance with the foregoing.

The features and advantages described in the specification are not all inclusive and, in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the disclosed subject matter.

BRIEF DESCRIPTION OF THE FIGURES

Other advantages and features will be more readily apparent from the following detailed description and the appended claims. The detailed description will make reference to the following figures:

FIG. 8 illustrates one embodiment of a profile/action concordance table.

DETAILED DESCRIPTION

A preferred embodiment is now described with reference to the figures where like reference numbers indicate identical or functionally similar elements.

The embodiments are, by way of example only, and with reference to the accompanying figures introduced above.

Figure 1:
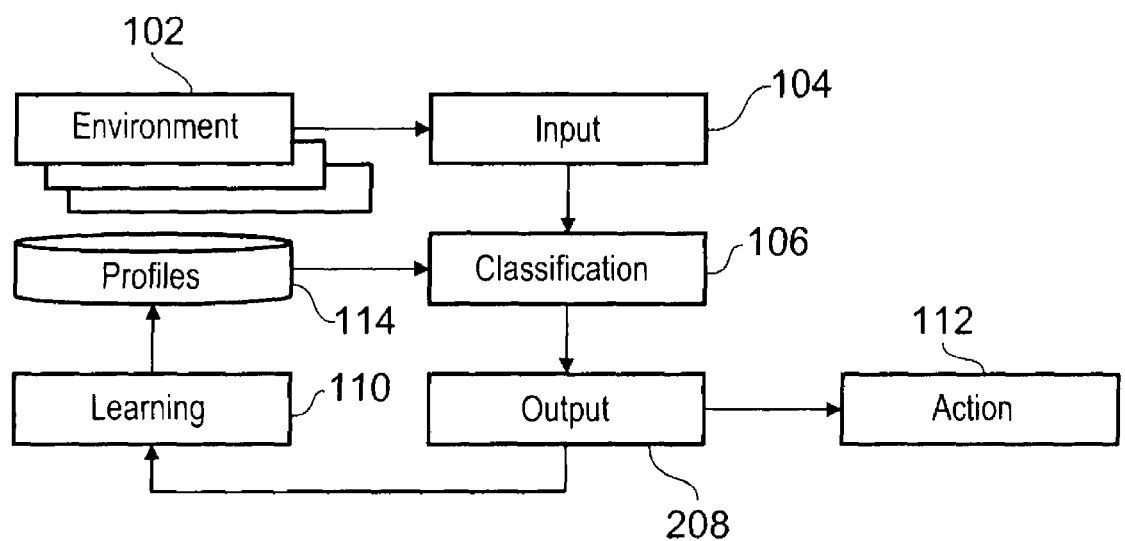
FIG. 1 is a schematic illustration of one embodiment of an architecture of a disclosed system.

A general overview of the operation of an embodiment will now be described with reference to the functional architecture illustrated in FIG. 1. Environment sensor modules 102 are configured to sense a value of one or more aspects or features of the environment at a particular time or in a particular time window. An aspect or feature is something in the environment that can be sensed and a value assigned to it. An aspect or feature with an assigned value is termed herein an attribute of the observed environment.

The value may be a logical value such as true or false, which merely indicates the presence or absence of an aspect or feature in the environment, or it may be a numeric value indicating the amount of something in the environment, for example. The environment may be a physical environment, a processing or executing environment such as a computer application that is being run on a data processing apparatus or the state of a data processing apparatus, or a combination of two or more, for example.

Input module 104 is configured to collect attribute values from the environment sensors 102. This may be done automatically or triggered by user input. One or more attributes sensed at the same time or within the same time window form an environment profile, which may be considered a "snapshot" of the environment. The input module 104 forwards the observed profile to classification module 106. The classification module 106 compares the attributes of the forwarded observed profile with profiles stored in profiles database 114.

The classification module 106 assigns a default prediction factor to each attribute in a profile the first time the profile is created. At a later time the input module 104 may collect attributes of the environment observed by sensors 102. Classification module 106 may compare the newly observed profile to see if its attributes match any of the stored profiles. The profile and best match score is passed to output module 108 which distributes it to learning module 110 and action module 112. Action module 112 evaluates the profile and matching score and may initiate an associated task or state for the data processing apparatus associated with the stored profile providing the best match, for example.

If the observed profile is different from any of the stored profiles but sufficiently closely matching, the learning module 110 uses the differences to adapt and adjust a stored profile, such as a stored profile having the closest match to the observed profile, by adjusting the prediction factors associated with the presence of one or more of the attributes in the stored profile. In this way, stored profiles may be automatically adapted and adjusted based on differences between observed profiles and stored profiles. Thus, stored profiles may be gradually adapted and adjusted to take into account changes in the environment. If no sufficiently closely matching stored profile is found then the learning module 106 may initiate storing of the observed profile in the profiles database, as a new profile.

In a particular embodiment, the data processing apparatus comprises a communications device such as a smartphone. In this embodiment the presence of Bluetooth devices in an environment of a smartphone is sensed. A smartphone is a mobile communications device which provides functions in addition to voice and/or data communications, for example it may provide address book functionality or run applications such as word processor applications or other application software.

For simplicity and clarity of description the following description refers to a smartphone in which only Bluetooth signals are sensed, although it will be evident to a person of ordinary skill in the art that other aspects of the environment may be sensed by the smartphone dependent on what sensor modules or sensing operations are included in the smartphone.

Figure 2:
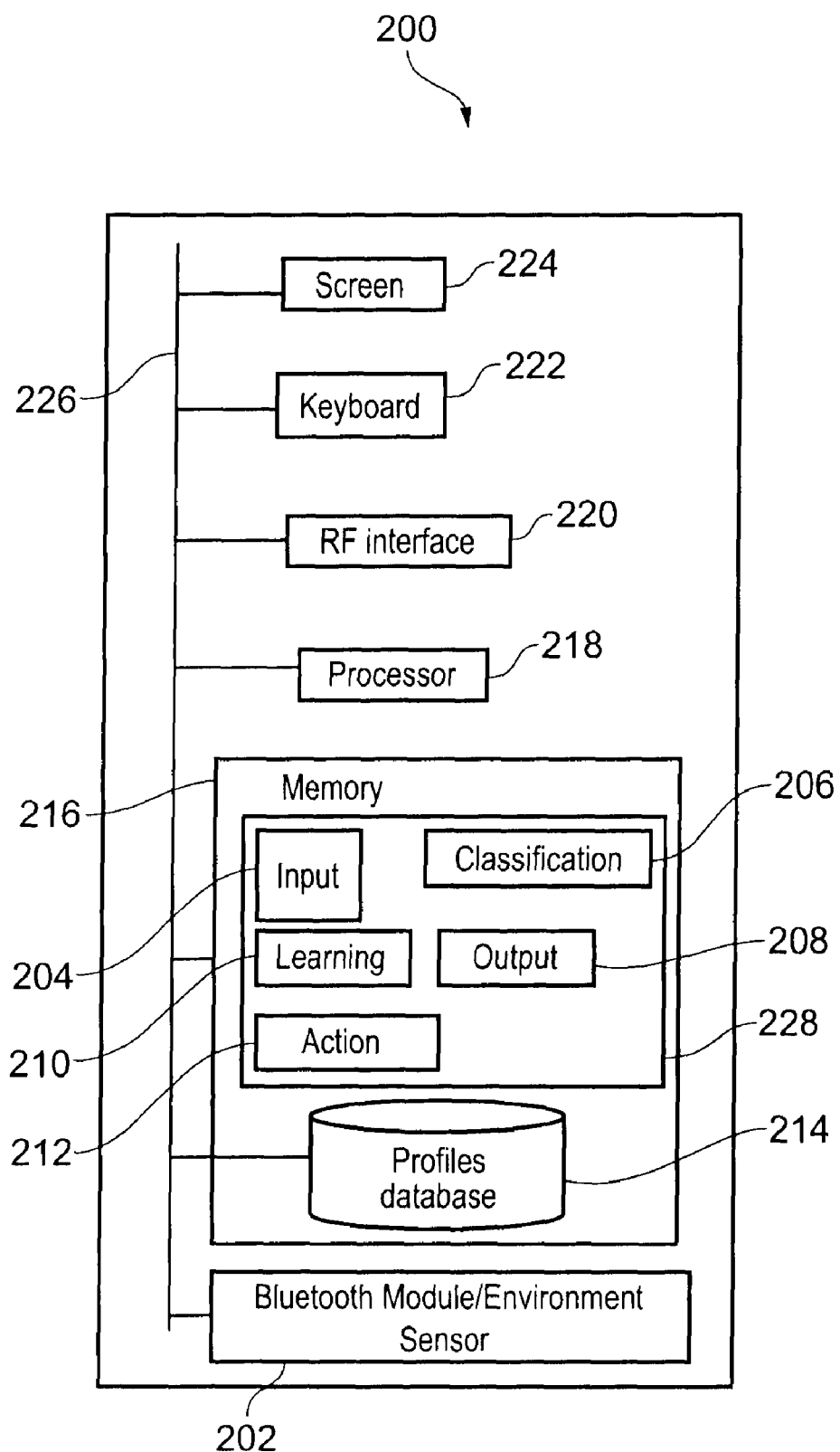
FIG. 2 is a schematic illustration of one embodiment of a mobile communications device.

FIG. 2 is a schematic illustration of a smartphone 200 configured in accordance with an embodiment of the present invention which senses Bluetooth protocol wireless signals in the environment of the smartphone 200. Example smartphones include 12, 20, or 24-key keypad smartphones. Other example smartphones include smartphones having mechanical or on-screen character keypads in a keyboard type layout. By way of example, such keyboard type layouts include a 'QWERTY' (having, inter alia, 'Q', 'W', 'E', 'R', 'T', 'Y', keys successively in a row), 'AZERTY', 'QWERTZ', 'QZERTY', Dvorak, or double-byte keys keypad layout.

Smartphone 200 comprises a screen 224, a keyboard 222, an RF interface 220, a processor 218 and a memory 216, all of which are connected to a data bus 226. Stored in memory 216 are an environment classification application program 228 and an environment profiles database 214. Also included in smartphone 200 is a Bluetooth module 202 which provides Bluetooth communication and Bluetooth sensing. Bluetooth is a low power wireless communications protocol for wirelessly communicating between devices such as computers, printers and communications devices. The protocol is governed by the Bluetooth Special Interest Group (SIG).

The keyboard 222 enables a user of the smartphone 200 to enter text data and commands into the smartphone 200. The processor 218 is configured to run the environment classification application 228 which is stored in memory 216 and provide a graphical user interface to the user on the screen 224. The RF interface 220 is configured to provide wireless communication with other devices for example within a cellular radio telephone network. It is noted that the keypad can be mechanical or on-screen and may in some instances comprise a combination thereof, e.g., an on-screen haptic keypad or touch sensitive keypad. The processor 218 may run environment classification application 228 automatically as a background routine during operation of smartphone 200, or in response to a user input through, for example, keyboard 222.

Environment classification application 228 comprises an input module 204 which receives Bluetooth identifier information from the Bluetooth module 202 and passes it to classification module 206. The classification module 206 compares the information from input module 204, processes the information and provides an output to output module 208. Output module 208 then passes the result of the classification module to learning module 210 and action module 212.

When a Bluetooth enabled device has its Bluetooth module turned on it periodically transmits from its Bluetooth module a signal announcing its availability for communication. The signal comprises a Bluetooth identifier for the device which is unique to each device. The Bluetooth identifier may be in the form of a Bluetooth module's MAC (Media Access Control) address, which has the format xxx.xxx.xxx.xxx. It is noted that one embodiment, the 'x's can be integer number values. In an environment where there are a number of Bluetooth enabled devices operating, a number of Bluetooth identifiers may be transmitted. For example, where there are three Bluetooth devices operating, signals comprising respective identifiers xxx.xxx.xxx.xx1; xxx.xxx.xxx.xx2; and xxx.xxx.xxx.xx3 may be present.

Bluetooth module 202 of smartphone 200 may detect each Bluetooth identifier in the environment and thereby sense the presence and communications availability of the three other Bluetooth enabled devices. Additionally, Bluetooth module 202 may also transmit its own identifier, for example xxx.xxx.xxx.xx4. In the currently described embodiment, the Bluetooth value is a logical value true or false indicating the presence or not of a Bluetooth device in the environment.

During execution of environment classification module application 228, input module 204 acquires from Bluetooth module 202 a "snapshot" of the observed Bluetooth identifiers detected by the Bluetooth module. The snapshot may be made at an instant in time or over a short time period. Acquisition of the snapshot may be under control of the classification application 228 itself, or in response to a user input, for example via a function button on keyboard 222. The creation of a new Bluetooth profile in accordance with an embodiment of the invention will now be described with reference to FIG. 3 and with reference to the process flow control diagrams of FIGS. 4 and 5.

Figure 3:
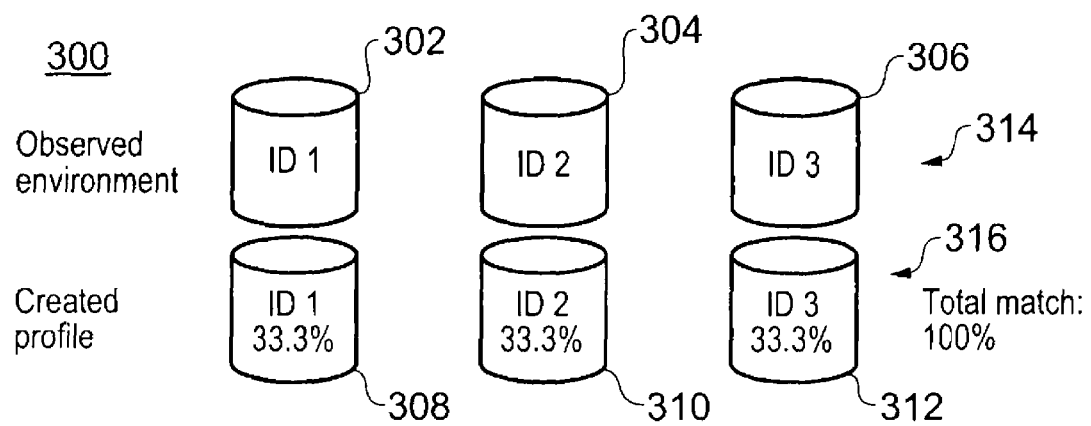
FIG. 3 is a schematic illustration of one embodiment of a stored profile created from an observed profile.

FIG. 3 illustrates an environment 300 in which Bluetooth identities ID1 302, ID2 304 and ID3 306 are present, and form an observed environment profile 314. If this is the first time that this combination of Bluetooth identities are sensed as present in an environment, a new profile is created 316 by the environment classification application and stored in profiles database 214. The created profile 316 comprises the Bluetooth identities, 308, 310, 312 and their prediction factors. The prediction factors are made equal to each other and are normalized to add up to 100%, and, therefore, in the illustrated example each prediction factor is 33.3%. Each Bluetooth identity and its associated prediction factor is an attribute of the created profile 316.

The stored profiles may be provided and stored with an identity label or stored in defined memory locations in profiles database 214. For illustrative purposes in this description the profiles may be considered to be labeled and stored numerically as profile(1) . . . profile(g) . . . profile(m). Within each created and stored profile each attribute is identified. Again, for illustrative purposes in this description the attributes may be considered to be labeled and stored numerically as attribute(1) . . . attribute(h) . . . attribute(n).

In the currently described embodiment the creation of a new profile results from operation of both the classification module 206 and the learning module 210. Operation of the classification module 206 and the learning module 210 will now be described with reference to the process flow control diagrams 400 and 500 illustrated in FIGS. 4 and 5, which provide merely one example of how the classification module 206 and learning module 210 may be implemented.

The classification module 206 receives an observed profile from the input module 204, S402. A counter "g" is assigned the value zero, S404, and then incremented by 1 at step S406. Stored profile "profile(g)" is retrieved from profiles database 214 via the classification module 206, S406. A counter "h" is then assigned the value zero, together with a variable "score" which is also assigned the value zero, S408. The variable "score" indicates the correlation level or similarity of the observed profile 314 with a stored profile, and is updated during operation of the classification module 206.

Counter "h" is incremented by 1 and the attribute(h) of profile(g) is made available for comparison with the attributes in the observed profile 314, S410. Attribute(h) of profile(g) is then compared with the attributes of the observed profile 314, S412. If attribute(h) is found in the observed profile 314 then that process control flows to step S414 where the prediction factor assigned to attribute(h) is added to the "score" value. If attribute(h) is not found in the observed profile 314 then the prediction factor for attribute(h) is subtracted from the "score" value, S416. If the counter value "h" reaches the maximum value "m", where "m" is the number of attributes in the stored profile, S418, process control flows to step S420. If the counter value "h" is not the maximum value "m" process control flows back to step S410, h incremented by one and the next attribute retrieved. If counter g=n at step S420 the process control flows to step S422. At step S422 the stored profile having the highest score is selected, and output to both learning module 210 and action module 212, S424. The best match profile is the profile having the highest score of all, and will lie in the range −100 to 100. From the foregoing description of one example of the operation of the classification module 206, a person of ordinary skill in the art will readily understand how a correlation level or similarity score is derived for an observed profile and respective stored profiles.

The operation of learning module 210 will now be described with reference to the process flow control diagram 500 illustrated in FIG. 5. The stored profile with the highest score (best match score) is received by the learning module 210 together with the observed profile, which becomes the "profile to learn from" for the learning module, S502. It is then determined whether the score is less than a "similarity threshold", S504. The "similarity threshold" may be pre-set and/or modifiable by a user of the smartphone incorporating the environment classification application 228. A suitable "similarity threshold" is 30%, although other values may be used at the application implementer's or user's discretion.

If the highest score is less than the similarity threshold then process control flows to step S506 where a profile capture signal is established and the observed profile is treated as a newly created profile. Normalized prediction factors are assigned to each attribute such that the prediction factors add up to 100%. The new profile is in effect created as described with reference to FIG. 3 above, and is then stored in profiles database 214, S510. If the score is equal to or greater than the similarity threshold the score is checked to see if it equals 100% and there is a perfect match between the observed profile and the highest scored profile, S512. If there is a perfect match, the learning module then stops, S514. Optionally, the learning module may be configured to stop for a similarity less than 100% in which case the test at S512 would be against a score lower than 100%.

Figure 7:
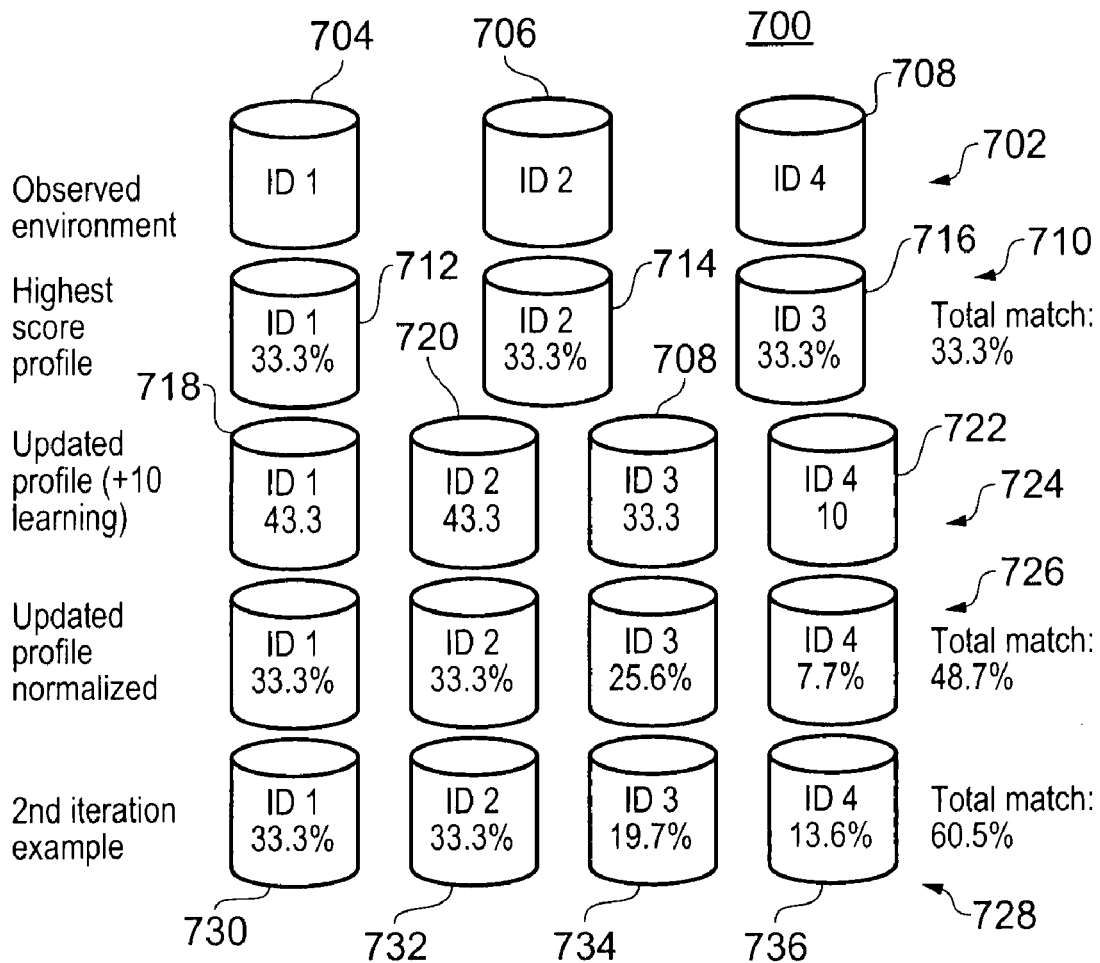
FIG. 7 is a schematic illustration showing iterations of one embodiment of an updated stored profile based on an observed profile.

Before continuing with the description of the process flow control diagram 500 reference will be made to FIG. 7, which is a schematic illustration of how a stored profile is updated based on a different observed profile. An observed environment profile 702 includes Bluetooth identities ID1 704, ID2 706 and ID4 708. In the described example a highest score profile 710 comprises Bluetooth identities ID1 712, ID2 714 and ID3 716. The correlation between the observed environment profile 702 and the highest score profile 710 has been determined to be 33% by the classification module 206.

The observed profile 702 and highest score profile 710 are compared and for each attribute that is present in both profiles a learning factor of 10 is added to the attribute's prediction factor to form an updated profile 724. Thus, ID1 704 and ID2 706 have their prediction factors increased to 43.3 defining new attributes 718 and 720. ID3 708 remains unchanged as there is no corresponding attribute in the observed profile 702.

Attribute 708 (ID4) in observed profile 702 is not present in the highest score profile and so is added to updated profile 724, and the prediction factor initialized to the learning factor 10 to form attribute 722 of updated profile 724. The prediction factors of the updated profile 724 are normalized to 100% by summing the prediction factors of the updated profile and dividing the sum by 100 to derive a prediction factor. The sum may be considered to be the total confidence value for the profile. Each prediction factor is then divided by the normalization factor to derive a percentage prediction factor. In the described example:

Total confidence=Sum=43.3+43.3+33.3+10=129.9;

Normalization factor=129.9/100=1.299;

43.3/1.299=33.3%

33.3/1.299=25.6%; and

10/1.299=7.7%.

This gives a 48.7% match or confidence factor as would be derived by the classification module 206. If observed profile 702 should occur again the resultant updated profile 728 would have attributes ID1 730 and ID2 732 with prediction factor 33.3%, ID3 734 with prediction factor 19.7% and ID4 726 with prediction factor 16.6%. Thus, after two iterations the updated profile slowly begins to adapt to ID4 708 being present in the environment which used to have ID3. Thus, the prediction factor for ID4 increases and the prediction factor for ID3 diminishes resulting in a decreasing prediction factor for ID3 and an overall ever increasing matching score for the profile. The matching score increases to 60.5%. Thus, environment classification application through the learning module 210 adapts stored profiles to changing environmental conditions.

At step S514 a counter i is initialized to zero, and then incremented by 1, S516. Attribute(i) of the observed profile is made available for comparison with the attributes in the highest scored profile, S518. Attribute(i) of the observed profile is then compared with the attributes of the highest scored profile, S520 to determine if attribute(i) is present in the highest scored profile. If attribute(i) is found in the highest scored profile then the process control flows to step S524 where a learning factor is added to the prediction factor assigned to the corresponding attribute in the highest scored profile.

If attribute(i) is not found in the highest score profile then process control flows to step S522 where the attribute(i) is added to the highest score profile and just the learning factor is added to the attribute(i) as a prediction factor, S524. The learning factor may be any suitable value set by a designer of the environment classification application and/or may be user definable. A non-limiting example value is 10.

In this way attributes that are not always found may be reduced in their importance. The learning factor may be adjusted, or set, according to what level of sensitivity to environment changes is desired. For example, a high learning factor provides high sensitivity to environment changes. If a learning factor approaches infinity it may cause instant dropping or instant incorporation of an attribute in a profile.

Additionally, making the learning factor a function of the number of detected attributes provides for the same absolute amount of learning to be achieved for every iteration independent of the number of attributes. The formula (100%/number of detected attributes) * learning factor may provide an equal amount of change due to the learning being distributed over all detected attributes.

Figure 5A:
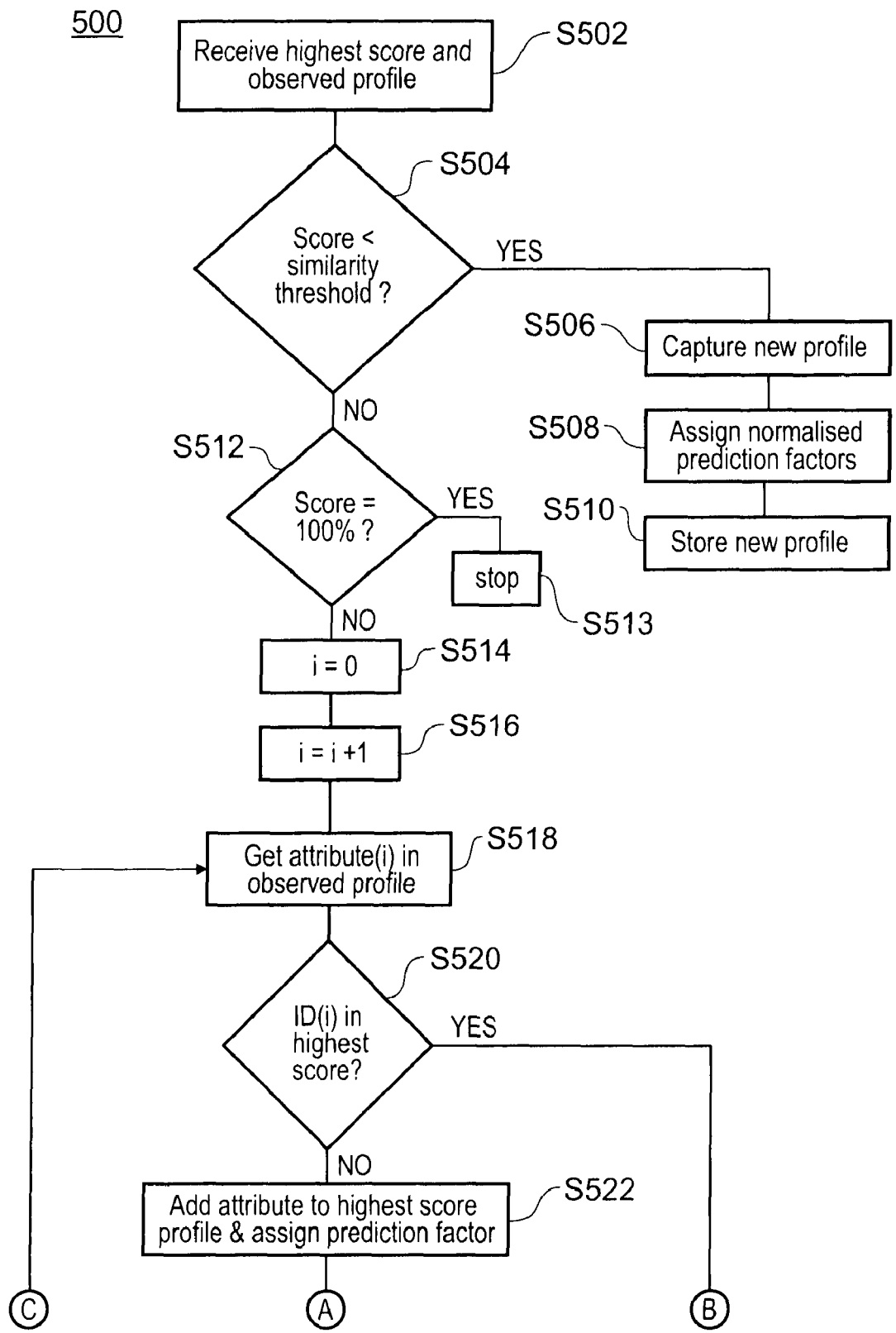
FIG. 5 is a process flow control diagram for one embodiment of a learning module.
Figure 5B:
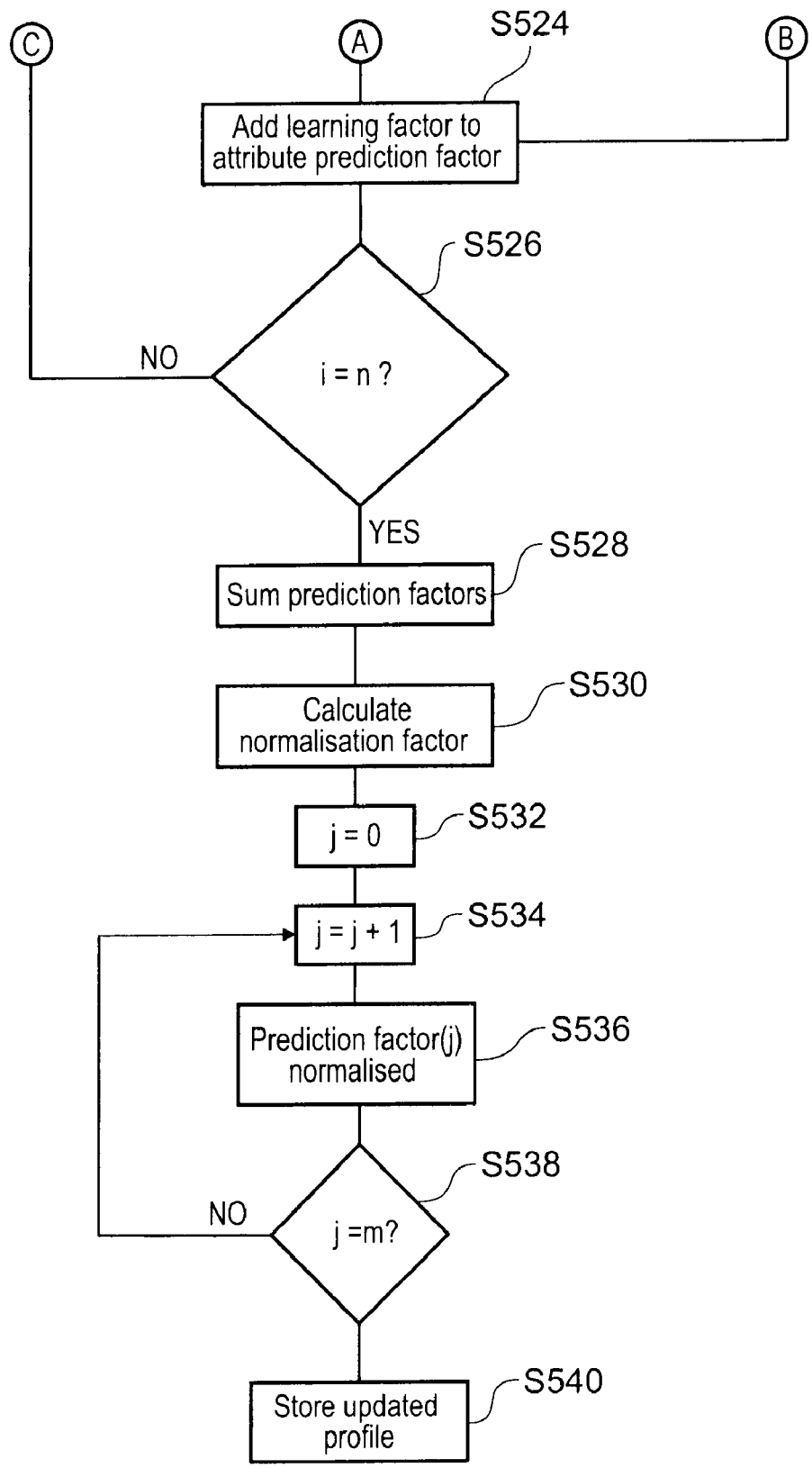
Figure 6:
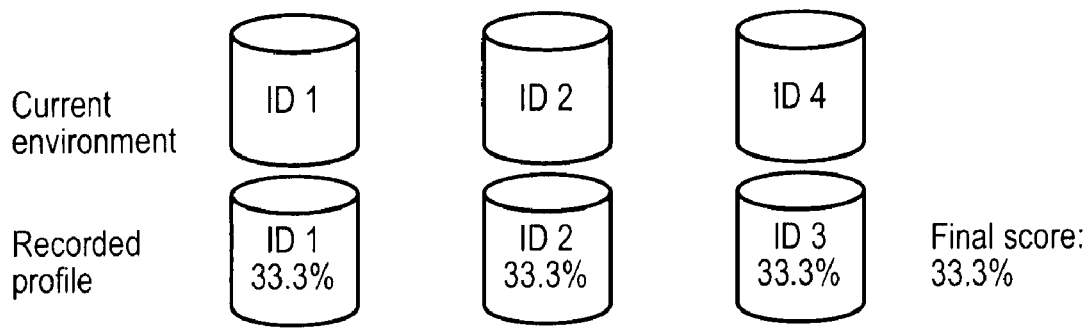
FIG. 6 is a schematic illustration showing a final match score for one embodiment of an observed profile and stored profile.

Referring back to the process flow control diagram of FIG. 5, a check is then made to determine if the attribute that is being considered is the last attribute of the observed profile, attribute(n) where there are n attributes in the observed profile. The check comprises determining if counter i is equal to n or not, S526. If counter i is less than n the process control flows to step 518 where the next attribute(i) in the observed profile is obtained ready for comparison with the highest score profile.

If the final attribute in the observed profile has been compared with the highest score profile then the sum of all the updated prediction factors and the prediction factors of any attributes added to the now updated highest score profile is calculated, S528, to obtain a total confidence value. The total confidence value is divided by 100 to obtain a normalization factor, S530. Each prediction factor associated with each attribute in the updated highest score profile is divided by the normalization factor to derive a normalized updated prediction factor which may be expressed as a percentage.

In the described embodiment, the normalization process starts by initializing a counter j to zero, S532, and incrementing the counter j by 1, S534. The prediction factor of attribute (j) is then divided by the normalization factor, S536. At step S538 a check is made to determine if the prediction factor of the final attribute(m) has been normalized by checking if counter j is equal to m, where m is the number of attributes in the updated profile.

If counter j is less than m the process flow control flows back to step S530, otherwise control flows to step S540 where the updated profile is loaded into the profiles database 214 and overwrites or replaces the stored profile from which the updated profile was derived. Operation of the learning module may also be described by way of the following pseudo-code. Pseudo code for an embodiment of the learning module:

```
For all IDs(attributes) in profile-to-learn-from (observed profile)
    if ID(attribute) does not exist in profile-to-update(highest score profile)
        create ID(attribute)
    find ID(attribute) in profile-to-update(highest score profile)
    Add <learning factor> to IDprediction factor
Next ID(attribute)
Totalconfidence=0
For all IDs(attributes) in profile-to-update(highest score profile)
    Totalconfidence+=IDprediction factor
Next ID(attribute)
NormalizationFactor=Totalconfidence/100%
For all IDs(attributes) in profile-to-update(highest score profile)
    IDprediction factor=IDprediction factor/NormalizationFactor
Next ID(attribute)
```

Attributes need not comprise logical values, for example attributes based on Bluetooth identities do not need to be logical values, but may be variable values such as received power level. To emulate a ranged variable, i.e. multiple levels of the same attribute, (varying light levels is another example) continuums may be used. For example, on a scale from 0 to 1, the range 0 to 0.33 would represent a low "power level" or "low light level present", 0.33 to 0.67 as a "medium power level" or "medium light level present" and 0.67 to 1 as "high power level" or "high light level present". In one embodiment each of these continuums could have a different attribute identity (ID) and thus constitute a different aspect of an environment from each other. Optionally each different observed value could be considered a separate aspect, instead of splitting the variable range into sub-ranges.

In another embodiment or in combination with the embodiment described above, the classification module 206 may also be configured to take into account an 'expected level' variable attribute and for example normalized to a 0 . . . 1 range. This type of variable value attribute may have some benefits over the 'emulated ranged variable'. By comparing the expected level and the observed level, an error value can be computed. In the described embodiments this allows for, for example, the factoring in of Bluetooth signal strength received at Bluetooth sensor module 202.

If a particular Bluetooth source is included in a stored profile and has a signal strength of 0.4 (on a scale of 0 . . . 1), then an observed profile including the same Bluetooth identity but different power would need to be taken into account. For example, if an observed profile includes the same Bluetooth identifier as an attribute but with a strength of 0.25 an error factor may be calculated. For example, in this example the error factor may be $(0.4-0.25)^2=0.0225$. Therefore, the influence of that reduced power level attribute could be diminished when used in predicting the current environment (as defined by the prediction value) by some value based on 0.0225. In such a scenario, the Bluetooth attribute is observed, but not at the expected signal strength. Therefore, its influence in predicting the current environment is diminished. The foregoing is provided by way of example only, and other formula and methods for determining and using an error factor may be implemented.

The 'expected level' variable may be suitable for use in situations where the 'observed level' can be computed by a formula and the result can be represented by a non-integer number. An attribute based on whole elements or things would not be suitable for non-integer value, but if a non-integer value might be meaningful since events that occur around the same time might be stronger related.

Figure 4A:
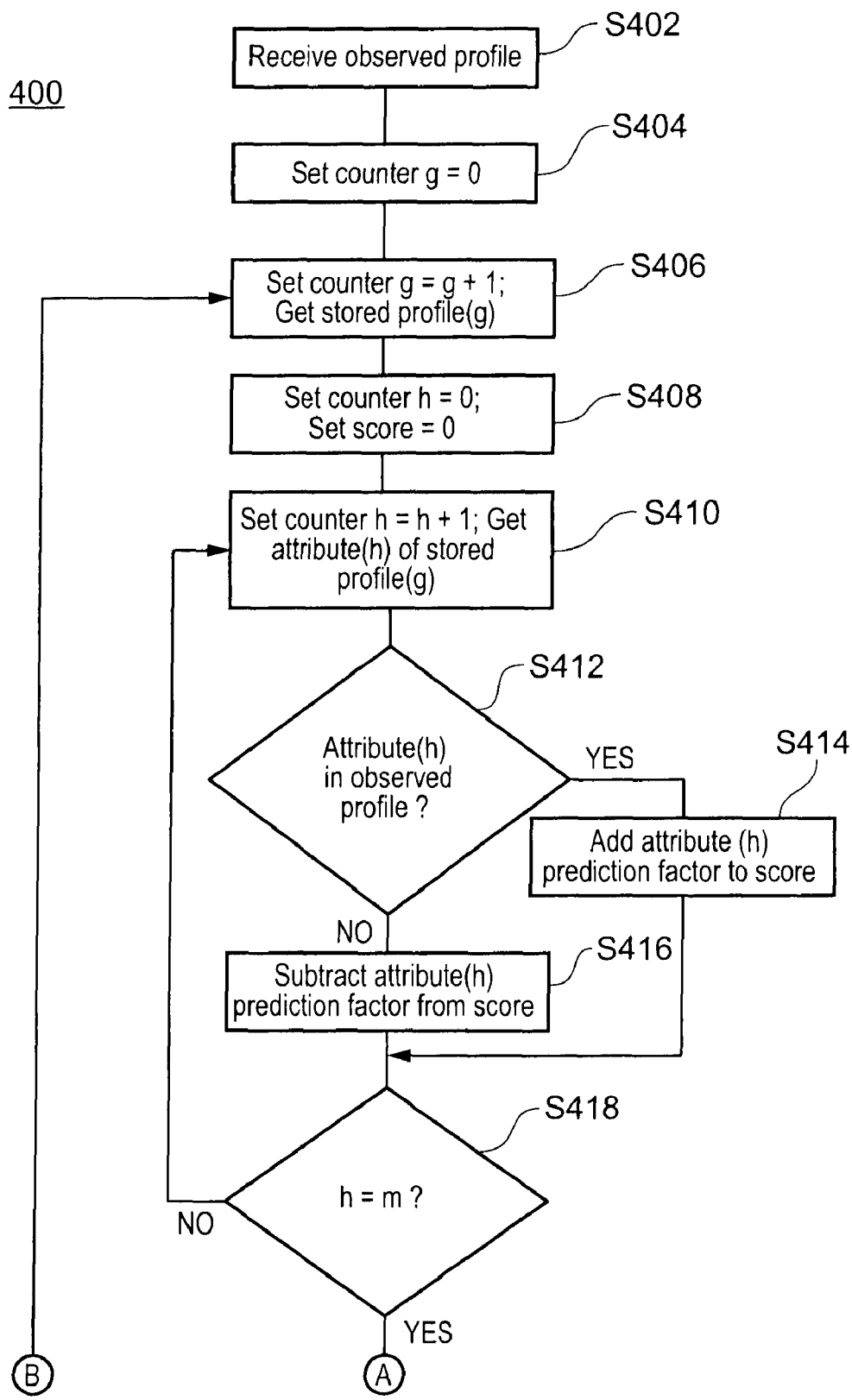
FIG. 4 is a process flow control diagram for one embodiment of a classification module.
Figure 4B:
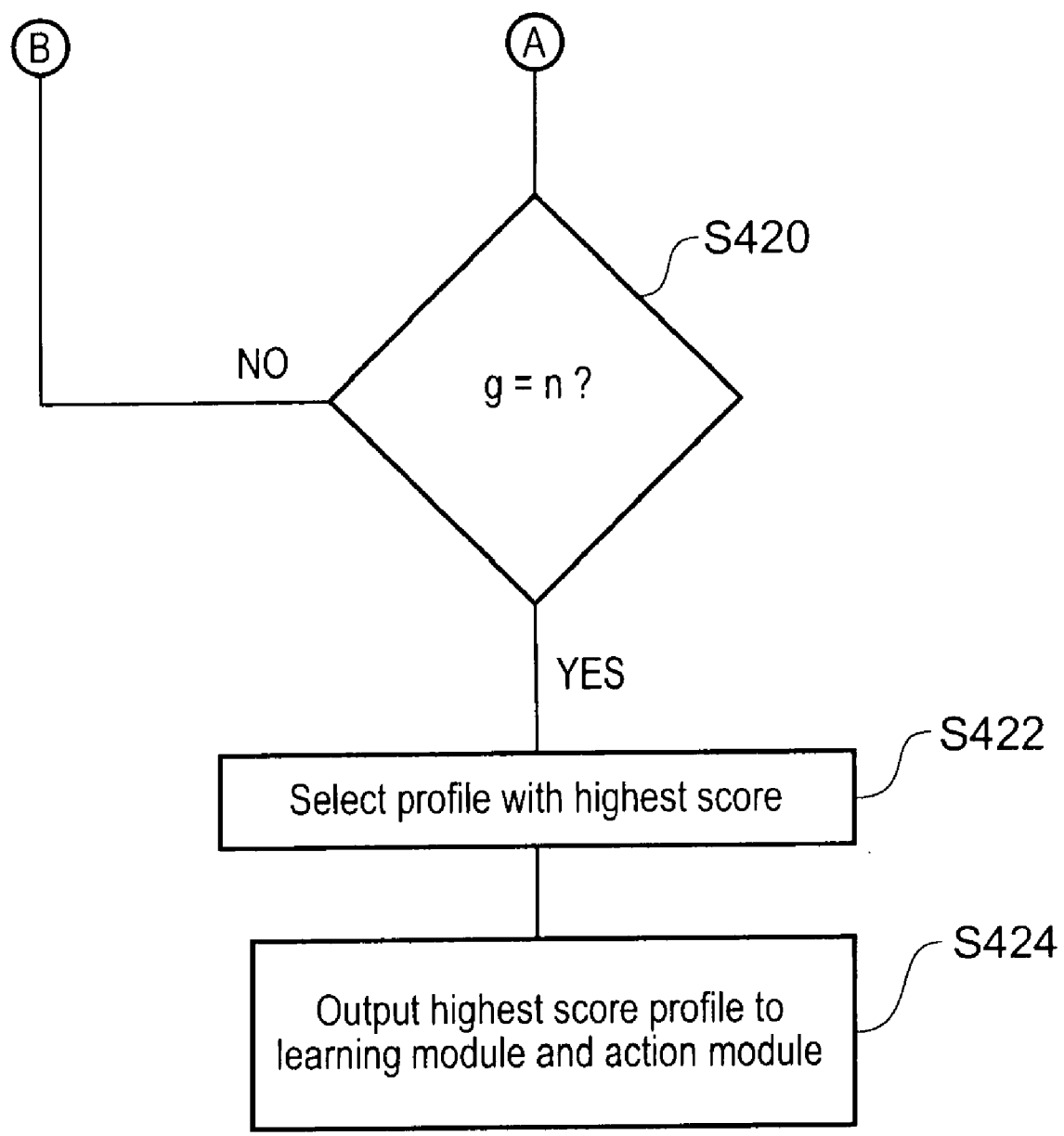

For such a modified embodiment of the classification module 206, the prediction factor added to the score at step S414 of process flow control diagram 400 illustrated in FIG. 4 may be multiplied by an "error factor". The "error factor" represents the difference between the power levels of the Bluetooth identity attribute of the stored profile and the same Bluetooth identity in the observed profile being compared with the Bluetooth identity attribute of the stored profile. Such a modified embodiment may include multiplication by the error factor at step 414 of the process flow control diagram 400.

By way of further non-limiting example, pseudo code for an implementation of such a modified embodiment of the classification module where Bluetooth attributes include a variable value representative of sensed power level for the Bluetooth signal is provided below. Pseudo code for modified classification module:

```
For all stored profiles
    score[profile]=0
    For all IDs(attributes) in stored profile
        if ID(attribute) in stored profile is in observed environment
            add ((prediction factor)×(error factor)) to score[profile]
        else
            subtract prediction factor from score[profile]
    Next ID(attribute) in stored profile
Next stored profile
```

The difference between attributes based on logical values and those with variable values may be such that when using an 'emulated ranged variable' approach a more precise prediction of an environment may be made as the different ranges are mutually exclusive. However if the 'expected level' variable approach is used to evaluate for example animal height, which for a particular observed profile is 1 m tall, there may be ambiguity between an animal that is 0.80 m (0.80 meters) tall and an animal that is 1.20 m tall. It could be either. This particular observation did not help in determining the environment, but the possibility that it is an animal that is 0.60 m tall or 1.40 m tall is now smaller, however such possibilities may still be under consideration. The classification module 206 may have never observed a 1 m tall animal before, but it has modified the profile into the right direction. The 'expected level' variable approach may be suitable for cases that might be interpolated or extrapolated. The 'emulated ranged variable' approach may be suitable for cases that can not be meaningfully interpolated or extrapolated.

Turning now to action module 212, action module 212 may be configured to automatically monitor the behavior of the smartphone for an observed profile. The action module 212 may form a concordance table in memory 216 as illustrated in FIG. 8. As can be seen from FIG. 8, three columns may be established where in the first column stored profile identities are listed; in the second column observed smartphone behaviors are listed; and in the third column actions to be initiated are listed. Optionally, an entry in the second column may be left blank if the action to be initiated for the corresponding stored profile has been set by a user of the smartphone.

As well as outputting the highest score profile to the learning module 210, the classification module 206 also outputs the highest score profile, or at least an identifier for the highest score profile, to the action module 212, S424. In the described embodiment, the action module receives the information on the highest score profile and looks that profile up in a concordance table, such as illustrated in FIG. 8, stored in memory 216. The action module initiates the action corresponding to the highest score profile. Therefore, profile(1) has the highest score then action module 212 initiates setting the smartphone to "silent mode".

The foregoing described embodiments address the issue of profile or environment "drift". For example, in a Bluetooth environment devices may move in and out of range if they are portable or are switched on or off. A whole Bluetooth environment may change over time, but the physical location that the smartphone resides in may stay the same. Embodiments of the invention may provide profile drift immunity since the environment classification application may keep track of a profile, while its constituent attributes change over time. The described embodiments achieve this by sensing the environment attributes at periodic intervals and adjusting for attributes changing in the environment.

In a further embodiment, the learning module 210 may be configured to look for strong commonalities in the stored profiles. Thus, two or more stored profiles with high correlation may be detected and the similar attributes identified. These similarities, in turn, may be stored as concepts (generalizations). The learning module 210 may create a parent profile that describes the common attributes and link the parent profile to the two profiles that have these attributes in common. In this way a "tree" structure may be developed for storing linked profiles. Trees could be built with any depth.

In an office Bluetooth environment, one such example of stored profiles that could have common attributes would be profiles corresponding to particular locations in the office such as 'water cooler', 'conference room' and 'my desk' where similar Bluetooth devices might be sensed and the learning module 210 develop a concept of the generic location 'office'. A user may name the new concept as 'office' or the learning module 210 may automatically correlate information from the device, for example from a diary or scheduler application running on the communications device.

An optimization gain may also be made. As the collection of profiles grows, searching through them all will take longer and longer. The automatically generated tree described above may speed searching up by enabling efficient searching. If the classification module 206 determines that the smartphone is not in the 'office', there is no need to match its children 'water cooler', 'conference room' or 'my desk'. As profiles may be updated, branches, nodes and leaves may be moved around and the branches grow and shrink.

As profiles drift, they may also converge. It may be that profiles that started out differently later describe exactly the same thing. In order to limit memory usage, reduce search times and optimize search trees, the learning module may be configured to automatically eliminate one of duplicate profiles for example. Additionally, action module 212 may be configured to make actions that were initiated for one or other of the duplicate profiles available to the remaining one profile. For example, if profiles corresponding to 'office' and 'home' converge because a user has started working from home, and one of them is deleted, the learning module 210 may update the action module 212 to configure it so that that the device can initiate actions associated with "home" such as use the 'home' WiFi connection and any other facilities that were linked to 'home'. The remaining profile may also initiate 'office' behavior/facilities/equipment. For example, alerts that were scheduled for 'office' now trigger when the smartphone is at a user's home and vice versa.

In view of the foregoing description it will be evident to a person skilled in the art that various modifications may be made in view of the disclosure herein. For example, the data-processing apparatus need not be configured as a smartphone but may be configured as another form of communications device such as a cellular telephone or a personal digital assistant (PDA) equipped with cellular radio communication capability. Optionally, the data-processing apparatus need not be configured as a communications device but may instead be a computer system such as a personal computer, a non-communications enabled PDA, microprocessor or other processing device or circuitry. Optionally, the environment classification application 228 need not use Bluetooth identifiers but could assign its own (e.g., proprietary) internal identification system.

The learning module may be configured to delete attributes from a stored profile where the prediction factor is below a minimum threshold value. This may reduce memory requirements. The learning module will automatically add deleted attributes as soon as they start being included in observed profiles again.

The learning module may be configured to automatically increase or decrease the learning factor for an individual attribute depending on how long or how often or not the individual attribute has been in the stored profile. This may automatically build in robustness for attributes which have consistently appeared in a stored profile over a long period of time for example, and render them resistant to short-lived changes in an observed profile. In other words, long held attributes may be less changeable.

Additionally, many aspects of a smartphone's or other device's environment may be sensed. For example, ambient light, noise or even temperature could be sensed and incorporated into a profile. What application is running on a device may also be sensed. For a telephony enabled device a particular number for the other party may be sensed. The foregoing are by way of non-limiting example and any anything that could be sensed may form part of a profile.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" or "computing device" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the disclosed embodiments.

The scope of the present disclosure includes any novel feature or combination of features disclosed therein either explicitly or implicitly or any generalization there irrespective of whether or not it relates to the claimed invention or mitigate any or all problems addressed by the disclosed embodiments. The applicant hereby gives notice that he claims may be formulated to such features during the prosecution of this application any such further application derived therefrom. In particular, with reference to dependent claims, features from dependent claims may be combined with those of the independent claims and features from respective independent claims may be combined in any appropriate manner and not merely in the specific combinations enumerated in the claims.

What is claimed:

1. A mobile computing device, comprising:
   a processing device; and
   a memory, wherein the memory comprises instructions that, when executed by the processing device, cause the mobile computing device to
   obtain a profile comprising one or more environmental attributes;
   compare the profile with a plurality of stored profiles;
   assign a similarity score to each of the plurality of stored profiles;
   identify a stored profile of the plurality of stored profiles with the highest similarity score;
   identify an action associated with the stored profile with the highest similarity score; and
   conduct the action associated with the stored profile.

2. The mobile computing device of claim 1, wherein the memory comprises further instructions that, when executed by the processing device, cause the mobile computing device to modify one or more of the plurality of stored profiles based on the profile.

3. The mobile computing device of claim 1, wherein the mobile computing device comprises a smartphone, cellular telephone, or personal digital assistant.

4. The mobile computing device of claim 1, wherein the one or more environmental attributes comprise a Bluetooth protocol device identifier.

5. The mobile computing device of claim 4, wherein the Bluetooth protocol device identifier is a Media Access Control address.

6. The mobile computing device of claim 1, wherein the one or more environmental attributes comprise at least one of an ambient light presence indication, a noise level indication, and a temperature indication.

7. The mobile computing device of claim 1, further comprising one or more sensors, wherein the mobile computing device obtains the one or more one or more environmental attributes from the one or more sensors.

8. The mobile computing device of claim 1, wherein the action is at least one of initiating a silent mode, initiating a vibrate mode, initiating call forwarding, initiating call filtering, and initiating an audible mode.

9. The mobile computing device of claim 1, wherein the one or more environmental attributes comprise one or more identifiers associated with one or more proximate mobile computing devices.

10. A non-transitory computer readable storage medium comprising instructions that when executed cause a device to:
    obtain a profile comprising one or more environmental attributes;
    compare the profile with a plurality of stored profiles;
    assign a similarity score to each of the plurality of stored profiles;
    identify a stored profile of the plurality of stored profiles with the highest similarity score;
    identify an action associated with the stored profile with the highest similarity score; and
    conduct the action associated with the stored profile.

11. The non-transitory computer readable storage medium of claim 10, wherein the one or more environmental attributes comprise a Bluetooth protocol device identifier.

12. The non-transitory computer readable storage medium of claim 11, wherein the Bluetooth protocol device identifier is a Media Access Control address.

13. The non-transitory computer readable storage medium of claim 10, wherein the one or more environmental attributes comprise at least one of an ambient light presence indication, a noise level indication, and a temperature indication.

14. The non-transitory computer readable storage medium of claim 10, wherein the action is at least one of initiating a silent mode, initiating a vibrate mode, initiating call forwarding, initiating call filtering, and initiating an audible mode.

15. The non-transitory computer readable storage medium of claim 10, wherein the one or more environmental attributes comprise one or more identifiers associated with one or more proximate mobile computing devices.

16. A method comprising:
    obtaining, by a mobile computing device, a profile comprising one or more environmental attributes;
    comparing, by the mobile computing device, the profile with a plurality of stored profiles;

assigning, by the mobile computing device, a similarity score to each of the plurality of stored profiles;

identifying, by the mobile computing device, a stored profile of the plurality of stored profiles with the highest similarity score;

identifying, by the mobile computing device, an action associated with the stored profile with the highest similarity score; and conducting, by the mobile computing device, the action associated with the stored profile.

17. The method of claim 16, wherein the action is at least one of initiating a silent mode, initiating a vibrate mode, initiating call forwarding, initiating call filtering, and initiating an audible mode.

18. The method of claim 16, wherein the one or more environmental attributes comprise one or more identifiers associated with one or more proximate mobile computing devices.

19. The method of claim 16, wherein the one or more environmental attributes comprise at least one of an ambient light presence indication, a noise level indication, and a temperature indication.

20. The method of claim 16, wherein the one or more environmental attributes comprises a Bluetooth protocol device identifier, and wherein the Bluetooth protocol device identifier is a Media Access Control address.

* * * * *

UNITED STATES PATENT AND TRADEMARK OFFICE
CERTIFICATE OF CORRECTION

PATENT NO. : 8,244,653 B2  
APPLICATION NO. : 13/042222  
DATED : August 14, 2012  
INVENTOR(S) : Ivo Ruben Willem Jager Page 1 of 1

It is certified that error appears in the above-identified patent and that said Letters Patent is hereby corrected as shown below:

In column 13, line 50, in Claim 1, after "device to" insert -- : --.

In column 14, line 18, in Claim 7, after "obtains the" delete "one or more".

Signed and Sealed this
Twelfth Day of March, 2013

Teresa Stanek Rea
*Acting Director of the United States Patent and Trademark Office*